United States Patent

Bert

[11] 4,025,954
[45] May 24, 1977

[54] PIEZOELECTRIC DEVICE FOR IMAGE READOUT

[75] Inventor: Alain Bert, Paris, France

[73] Assignee: Thomson-CSF, Paris, France

[22] Filed: Mar. 21, 1975

[21] Appl. No.: 560,921

[30] Foreign Application Priority Data

Mar. 26, 1974 France .............................. 74.10301

[52] U.S. Cl. .................................. 358/213; 310/8; 310/9.7; 250/211 R
[51] Int. Cl.² .......................................... H04N 3/14
[58] Field of Search ............ 178/7.1, 7.6, DIG. 18; 310/9.8, 8.1, 9.7, 8; 250/211 R

[56] References Cited

UNITED STATES PATENTS

| 3,505,572 | 4/1970 | Yamashita et al. | 310/8.1 |
| 3,787,786 | 1/1974 | Defebvre et al. | 310/9.8 |
| 3,826,865 | 7/1974 | Quate et al. | 178/7.1 |
| 3,826,866 | 7/1974 | Quate et al. | 178/7.1 |
| 3,893,047 | 7/1975 | Lardat | 310/9.8 |

OTHER PUBLICATIONS

"Planar Beam Steering Bulk Acoustic Wave Transducer", by L. Kuhn, IBM Technical Disclosure Bull., vol. 15, No. 10, 3/73, pp. 3275–3276.

Primary Examiner—John C. Martin
Attorney, Agent, or Firm—Roland Plottel

[57] ABSTRACT

A device which converts the spatial distribution of the received light energy into a modulation of an electric signal. It comprises: a non-piezoelectric substrate; an electro-mechanical transducer in the form of interleaved comb shaped electrodes deposited on the substrate and covered by a piezoelectric layer, and a photoconductive layer covering the piezoelectric layer. The image is projected on to the photoconductive layer and, when the transducer is short-circuited, an elastic wave modulated by the image is propagated in the substrate towards an output transducer which delivers the electric reading signal.

13 Claims, 8 Drawing Figures

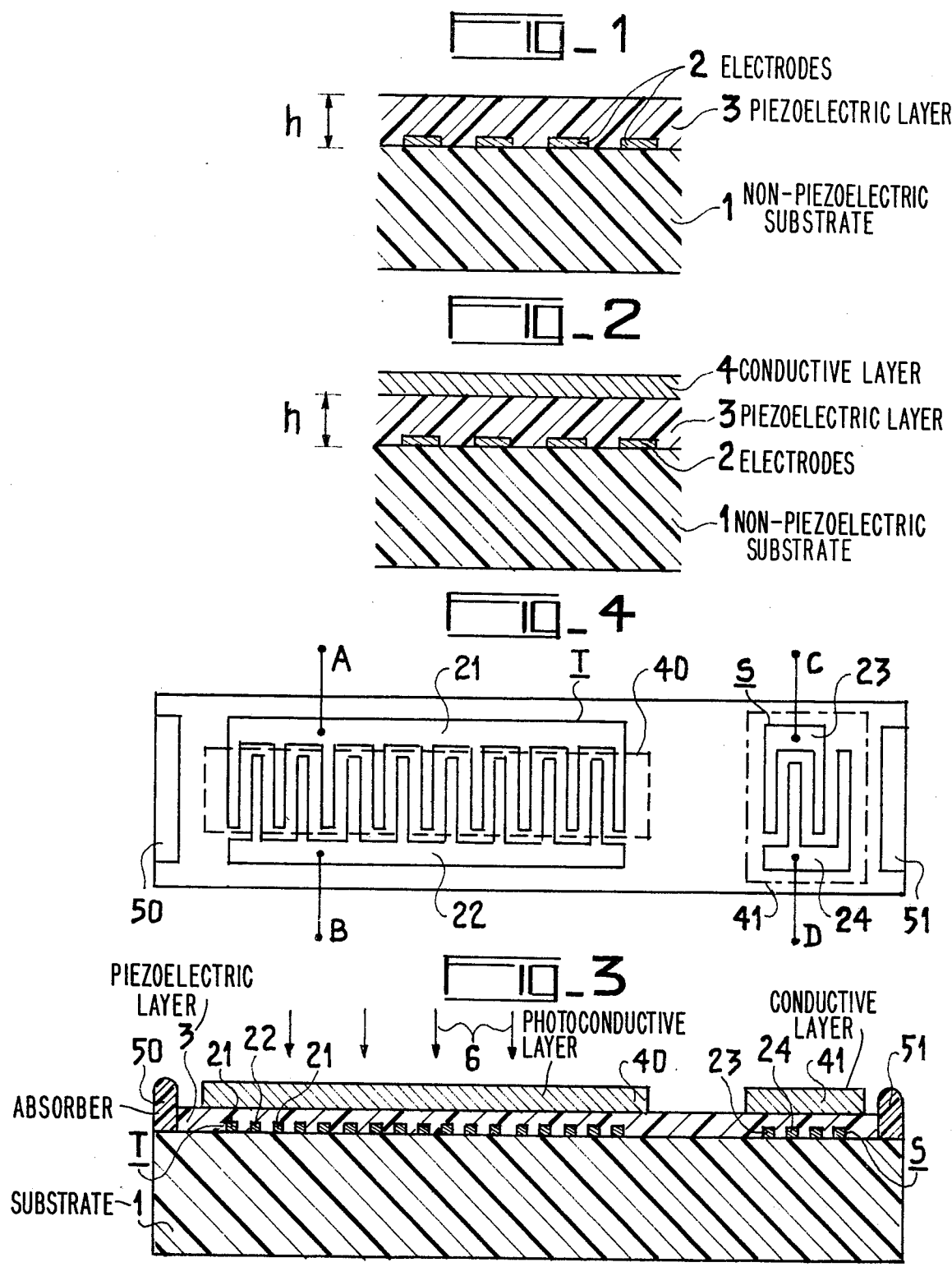

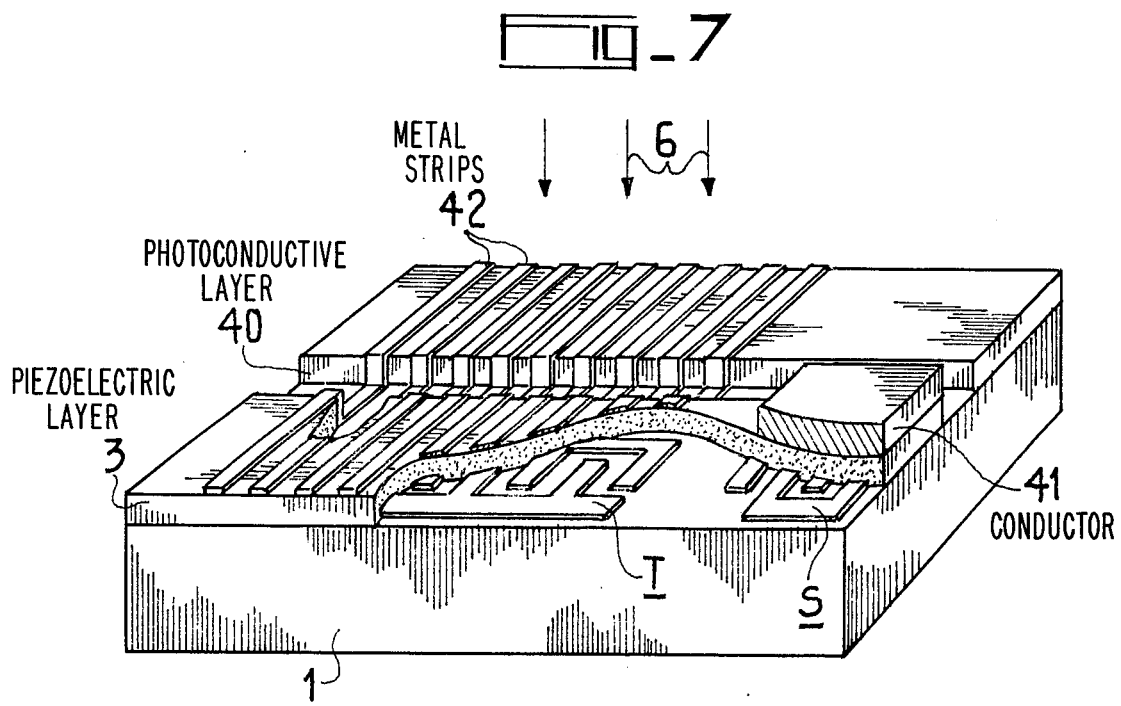
FIG_7
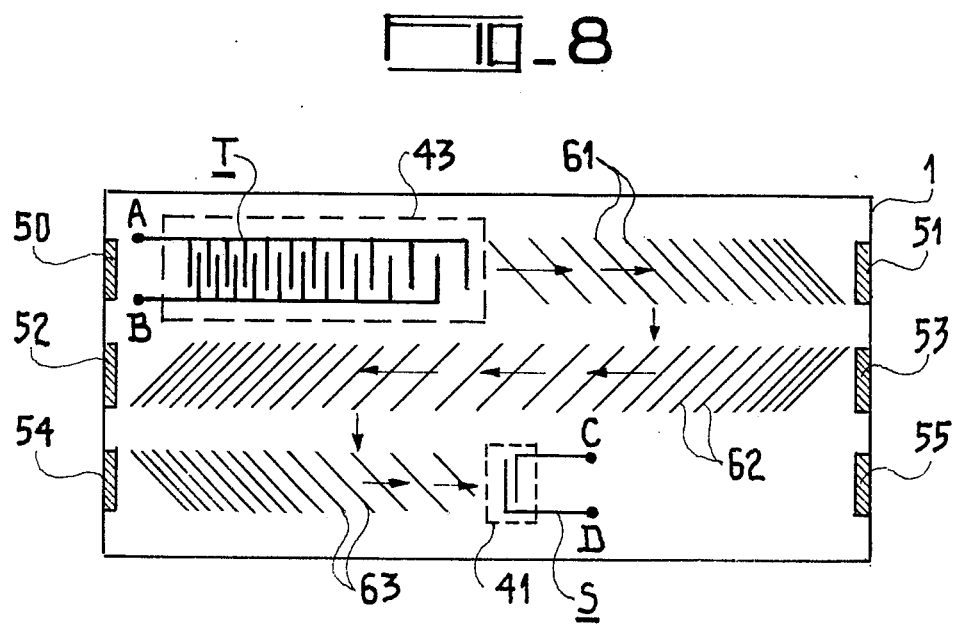
FIG_8

PIEZOELECTRIC DEVICE FOR IMAGE READOUT

The invention relates to an image read-out device for converting the spatial distribution of incident light energy into a modulation of an electric signal.

Among the various systems known, e.g. in television broadcasting, the vidicon tube is very frequently used. A vidicon tube comprises inter alia a photoconductive target on to which the image is projected; a beam of electrons scans the target point by point so that the image can be read, i.e. converted into a modulated electric signal. Systems of this kind have the disadvantage of being complex and bulky, mainly because of the electronic scanning.

The invention relates to an image read-out device which obviates the aforementioned disadvantages by using an elastic wave which is modulated either during emission or during reception, by the spatial distribution of the received light. The modulated elastic wave is subsequently converted in conventional manner into an electric signal, i.e. the reading signal.

In accordance with the present invention, there is provided an electric image read-out device providing a modulated electrical signal constituting the image read-out signal, comprising:

a substrate made of a non-piezoelectric material;

an electro-mechanical transducer for generating an elastic wave under the action of an electric signal and comprising two interleaved comb shaped electrodes, a thin layer of piezoelectric material deposited on said substrate opposite said combs, and a layer of photoconductive material on to which said image is projected, said photoconductive layer being without contact with said combs and being in electrical contact with said piezoelectric layer, thus modulating said elastic wave;

output means for converting said modulated elastic wave into said electric read-out signal.

For a better understanding of the invention and to show how the same may be carried into effect, reference will be made to the following description and accompanying drawings, wherein:

FIGS. 1 and 2 are explanatory diagrams;

FIGS. 3 and 4 are sectional and plan views respectively of an embodiment of the device according to the invention;

FIGS. 6, 7 and 8 show alternative embodiments of the device according to the invention.

Figure 5:
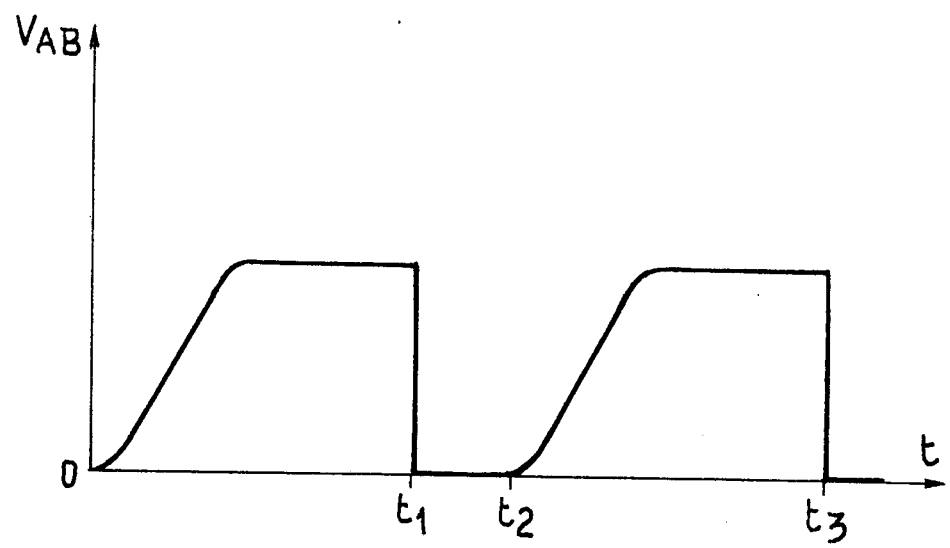
FIG. 5 is an explanatory curve.

In the drawings, like references denote like components.

FIGS. 1 and 2 diagrammatically illustrate the basic operation of the invention. They show the following, in cross-section: a substrate 1 made of non-piezoelectric material on which two interleaved comb shaped electrodes, having fingers 2, are deposited; a thin layer 3 of piezoelectric material having a thickness $h$ and deposited on 1 and 2; and (FIG. 2) an electrically conductive layer 4 convering layer 3.

When, in the two cases illustrated, an electric voltage is applied to the terminals of transducer 2, surface elastic waves are generated, that is which penetrate into material 3 for approximately one wavelength of the elastic wave; the waves can thus be transmitted to substrate 1. It is found, however, by calculation and experiment that the efficiency of the device, i.e., the ratio of the mechanical energy produced in the substrate to the electrical energy received, varies with the thickness $h$ of the piezoelectric layer 3, but in a manner which is different depending on whether the conductive layer 4 is present or not. For example, if the thickness $h$ is approximately $\lambda/20$, $\lambda$ being the elastic wavelength, the efficiency of the device in FIG. 1 (without layer 4) is very low, whereas the efficiency of the device in FIG. 2 (with layer 4) passes through a maximum.

FIGS. 3 and 4 are sectional and plan views respectively of an embodiment of the read-out device according to the invention, using the property just mentioned.

The device comprises inter alia: a non-piezoelectric substrate 1 made e.g. of glass, sapphire or preferably silicon; two electrodes in the form of interleaved combs 21, 22, disposed on substrate 1; a piezoelectric layer 3 deposited on the aforementioned components and made e.g. of zinc oxide, cadmium sulphide or lithium niobate, and a photoconductive layer 40 deposited on that part of layer 3 which covers the resulting electro-mechanical transducer T. The device also comprises an electro-mechanical output transducer S deposited on substrate 1. As shown by way of example in the drawing, transducer S may likewise comprise two interleaved combs 23, 24 covered by piezoelectric layer 3 and an e.g. metal electrically-conductive layer 41; alternatively it may comprise similar combs 23, 24 but covered with a thicker piezoelectric layer (conventionally of the order of $\lambda/4$). To simplify FIG. 4, layers 40 and 41 are shown in broken lines and, for example, are differently shaped, the layer 41 covering the whole surface of elctrodes 23 and 24. Finally, components 50, 51 which absorb elastic waves are provided at the ends of the device, so as to prevent such waves from being reflected at the ends of the device and interfering with its operation.

During operation, the light information to be read (i.e. the image) is projected onto photoconductive layer 40 as shown by arrows 6, so that layer 40 becomes locally conductive. Since the thickness $h$ of layer 40 is made approx. $\lambda/20$, the device behaves like the device in FIG. 1 in the weakly-illuminated regions, that is to say the efficiency of the elastic waves generation is low, and behaves like the device in FIG. 2 in the brightly-illuminated regions, that is to say the efficiency of the elastic waves generation is great.

A potential difference $V_{AB}$ which varies in time as shown in FIG. 5 is applied via terminals A and B to combs 21, 22. Potential $V_{AB}$ is slowly applied from the beginning and is maintained up to a time $t_1$, the image to be read being simultaneously projected on to the photoconductive layer 40; up to the time $t_1$, static mechanical stresses are produced and have an amplitude which depends on the local illumination. At the time $t_1$ the applied potential difference $V_{AB}$ becomes zero, thus releasing an elastic vibration which propagates in piezoelectric layer 3 and substrate 1. The amplitude of the vibration is modulated by the spatial distribution of the light energy, and its frequency depends on the shape adopted for transducer T. The output transducer S converts the elastic vibration into an electric reading signal obtained at terminals C, D of combs 23, 24.

It is to be noticed that the layer disposal shown on the drawings, i.e. the piezoelectric layer which separates the photoconductive layer from the combs, has the advantage of improving the insulation of the teeth of the combs, even when illuminating. Accordingly, in this device, the greatest intensity of the elastic wave is generated where the illumination is also the greatest. The advantage of this device is to avoid the addition of discrete components, such as resistances, for ensuring that insulation.

In the drawings, the thin piezoelectric layer 3 covers the entire substrate 1, but it is required only for forming transducers T and S and may be discontinuous between them. Preferably the discontinuity occurs without a sharp edge, so as to reduce reflections of the elastic waves.

In this embodiment, it is described as a modulation due to the light image, when the elastic wave is emitted. Of course, the reverse situation falls in the scope of the invention, i.e. the modulation during the reception of the elastic wave by the transducer. In this case, the device comprises a transducer like S emitting for example a non-modulated sinusoidal elastic wave, and another transducer, like T, receiving that wave and furnishing a electric signal which is modulated by the projection of the light image on the photoconductive layer, as described hereinbefore.

An important advantage of the device is that the time $0-t_1$ can be long, so that the effects of the light image on the photoconductive layer 40 can be integrated, thus ensuring high sensitivity.

A device of this kind cannot read an image in its totality, but is particularly adapted to a system for reading successive lines, in which case it must be combined with an optical or mechanical system for covering the rest of the image.

FIG. 5 shows a variation in $V_{AB}$ between two times $t_2$, $t_3$ after $t_1$. The variation, which is similar to the preceding variation between 0 and $t_1$, represents the reading of a subsequent line by the device. The time interval $t_2-t_3$ is made long enough to ensure that the limitations imposed by the preceding data do not interfere with the reading of the subsequent data.

In the case where the aforementioned device is used in television, it can be varied (not shown) by modifying the design of transducer T so as to obtain sync signals at the end of each line, e.g. by covering one end of the combs with a metal layer having a width selected in dependance on the desired shape of the sync signal.

Another important advantage of the device according to the invention is that it is constructed on a non-piezoelectric substrate 1, thus avoiding some of the technical limitations inherent in piezoelectric materials; in addition, since the substrates can be made of silicon, the device can be incorporated in an integrated circuit assembly.

In the drawings, combs 21, 22 are shown between substrate 1 and piezoelectric layer 3, and the conductive layer (4 or 40) is shown on the piezoelectric layer 3. This arrangement is not necessary concerning the position of the combs and conductive layer, which can be inverted, thus providing the following two advantages: substrate 1 made of silicon can also act as a photoconductor, so that layer 4 or 40 can be omitted and the insulation between the fingers of combs 21 and 22 can be improved.

Figure 6:
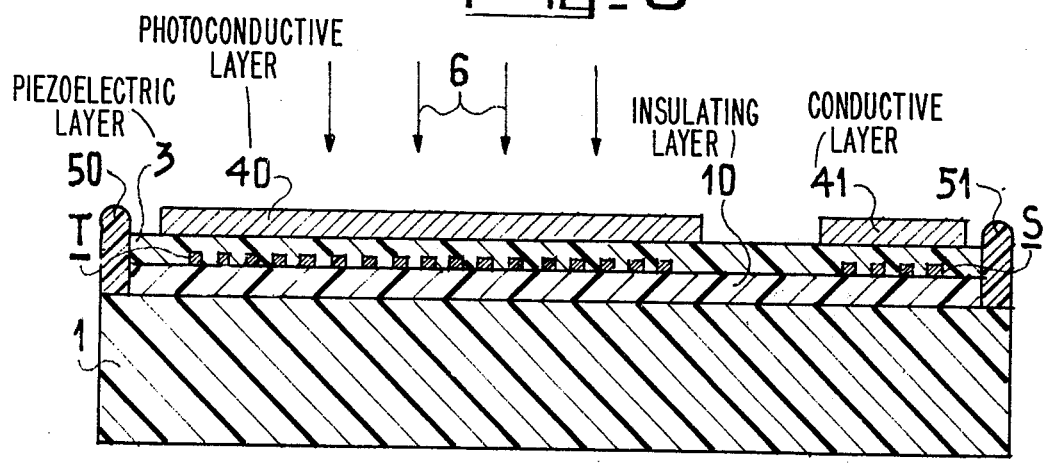

Another of method of improving such insulation is shown in FIG. 6, where transducers T and S are separated from substrate 1 by an insulating layer 10, which is made of silica in the case where substrate 1 is made of silicon. The last-mentioned structure operates like that described in FIG. 3 and can be used to reduce losses due to the action on the silicon of the field between the fingers of combs 21, 22.

The elastic wave may also be attenuated by its reflections at the comb fingers. This attenuation can of course be compensated by varying the width of the fingers, which can be done experimentally so that when the illumination is uniform, there is no modulation in the read signal.

FIG. 7 shows another embodiment wherein the piezoelectric and photoconductive materials are not superposed. FIG. 7 shows a non-piezoelectric substrate 1 on which transducers T and S and their piezoelectric layer are deposited. Substrate 1 is prolonged behind transducers T and S so as to receive a photoconductive layer 40 separate from layer 3. Metal strips 42, which are parallel in the drawing, successively cover layer 40, substrate 1 between layers 40 and 3, and layer 3. Preferably strips 42 are disposed opposite the comb fingers, which have the same pitch and the same width.

The device operates in similar manner to the preceding devices. Light information is projected (arrows 6) on to the photoconductive layer 40 only; layer 3 is covered with an opaque screen if required, and the variation in conductivity of layer 40 is transmitted via strips 42 to the assembly comprising substrate 1 and transducer T.

The last-mentioned variant has two advantages: it separates the operation of generating the elastic wave (transducer T) from the operation of modulating the wave (photoconductive layer 40), thus facilitating adjustment of the different parameters of the device, and it avoids any perturbation due to any slight photoconductivity of the material (inter alia, zinc oxide) used for the piezoelectric layer 3. The last-mentioned embodiment can also be used for processing information during broadcasting, e.g. by adding signals by joining two or more strips 42.

FIG. 8 is a plan view of a variant of the read-out device according to the invention adapted to obtain a read signal which is prolonged in time by a dispersion delay line. FIG. 8 shows a substrate 1, a transducer T covered with a photoconductive layer 43, (which for example in the present case covers all the combs) and an output transducer S.

The device also comprises a dispersion delay-line structure comprising three systems of discontinuities 61, 62, 63 which reflect the elastic waves when they are propagated in substrate 1. The discontinuities are constructed in conventional manner, e.g. in the form of grooves engraved on the propagating surface of the device, the grooves being parallel and at increasing or decreasing intervals. In the example shown in FIG. 8, four dispersion delay lines are placed in series, the higher frequencies being delayed with respect to the lower frequencies. To this end, the intervals decrease from the centre of the device towards the ends, and transducers T and S generate or receive elastic waves substantially at the middle of the device. The discontinuities in the different systems are at an angle to one another and disposed so that, during operation, the elastic waves from transducer T are reflected by the first system 61 to the second system 62, which reflects them to the third system 63, which reflects them to the output transducer S; the differences in the delay introduced by each system between elastic waves of different frequencies are cumulative. In the present case, the high-frequency waves travel the longest path, the adjacent discontinuities reflecting them being disposed at the periphery of the device.

The device also comprises components 50-55 at the ends of each system, the components being adapted to absorb elastic waves.

The last-mentioned embodiment can be used for prolonging the read signal and is thus particularly suitable for television systems, in which the scanning process is usually much longer than the reading time in the preceding embodiments, which is related inter alia to the length of transducer T. In the last-mentioned case, however, the device according to the invention must be combined with a signal for demodulating the read signal, which is then in the form of a sequence of signals at increasing frequencies.

What is claimed is:

1. An electric image read-out device providing a modulated electrical signal constituting the image read-out signal, comprising:
   a substrate made of a non-piezoelectric material:
   an electro-mechanical transducer for generating an elastic wave under the action of an electric signal, deposited onto said substrate and comprising a thin layer of piezoelectric material having two surfaces, two interleaved comb shaped electrodes deposited onto one of said surfaces, and a layer of photoconductive material in electrical contact with the other of said surfaces, onto which said image is projected, said transducer thus modulating said elastic wave while generating said elastic wave on the surface of said substrate;
   output means for converting said modulated elastic wave into said electric read-out signal.

2. A device according to claim 1, wherein the thickness of said piezoelectric layer is equal to approximately 1-20th of the length of said elastic wave.

3. A device according to claim 1, wherein said combs are disposed between said substrate and said piezoelectric layer and are in mechanical contact therewith.

4. A device according to claim 1, wherein said output means comprise: two interleaved output combs provided with output connections at which said read-out signal is picked; the part of said piezoelectric layer which covers the combs; and a conductive layer covering the last-mentioned part of the piezoelectric layer.

5. A device according to claim 1, wherein said piezoelectric layer covers only said combs and said output means.

6. A device according to claim 3, further comprising an insulating layer disposed on said substrate, said combs and said piezoelectric layer being deposited on said insulating layer.

7. A device according to claim 1, wherein said substrate is made of silicon.

8. A device according to claim 6, wherein said insulating layer is made of silicon oxide.

9. A device according to claim 1, wherein said photoconductive layer is disposed on said piezoelectric layer opposite said combs.

10. A device according to claim 1, wherein said photoconductive layer is disposed on said substrate without being in mechanical contact with said piezoelectric layer, electric contact with said piezoelectric layer being provided by electrically conductive strips disposed parallel to one another and to the fingers of said combs and extending continuously over said photoconductive layer, said substrate and said piezoelectric layer.

11. A device according to claim 10, wherein said conductive layers are disposed opposite said comb fingers.

12. A device according to claim 1, further comprising a dispersion delay line disposed on the substrate between said transducer and said output means.

13. An electric image read-out device providing a modulated electrical signal constituting the image read-out signal, comprising:
   a substrate made of non-piezoelectric material;
   input means for generating an elastic wave propagating upon the substrate;
   an electro-mechanical transducer for generating an electrical signal under the action of said elastic wave, and comprising two interleaved comb shaped electrodes on said substrate, a thin layer of piezoelectric material deposited on said substrate so as to cover said combs, and a layer of photoconductive material on to which said image is projected, said photoconductive layer being without mechanical contact with said combs and being in electrical contact with said piezoelectric layer, said transducer thus modulating said electrical signal which constitutes said image read-out signal.

* * * * *